United States Patent [19]

Priaroggia

[11] Patent Number: 4,699,459

[45] Date of Patent: Oct. 13, 1987

[54] JOINT FOR OPTICAL FIBER SUBMARINE CABLES

[75] Inventor: Paolo G. Priaroggia, Milan, Italy

[73] Assignee: Societa' Cavi Pirelli S.p.A., Milan, Italy

[21] Appl. No.: 746,558

[22] Filed: Jun. 19, 1985

[30] Foreign Application Priority Data

Jun. 29, 1984 [IT] Italy ................... 21650 A/84

[51] Int. Cl.⁴ .............................................. G02B 6/38
[52] U.S. Cl. ............................. 350/96.21; 350/96.23
[58] Field of Search ............... 350/96.20, 96.21, 96.22, 350/96.23; 174/70.R, 70 S

[56] References Cited

U.S. PATENT DOCUMENTS

| 4,516,830 | 5/1985 | Guazzo | 350/96.22 |
| 4,545,645 | 10/1985 | Mignien | 350/96.21 |

FOREIGN PATENT DOCUMENTS

| 0034286 | 8/1981 | European Pat. Off. | 350/96.23 |
| 0067673 | 12/1982 | European Pat. Off. | 350/96.20 |
| 55-95917 | 7/1980 | Japan | 350/96.23 |
| 59-37517 | 3/1984 | Japan | 350/96.20 |
| 59-45413 | 3/1984 | Japan | 350/96.21 |
| 2128357 | 4/1984 | United Kingdom | 350/96.23 |

Primary Examiner—John Lee
Attorney, Agent, or Firm—Brooks Haidt Haffner & Delahunty

[57] ABSTRACT

Joints for optical fiber, submarine cables in which the tensile resistant element is centrally located in the cables, rather than at the exterior of the cables, and all spaces between the cable elements are filled with a substantially incompressible fluid. In the joint, the end of the tensile resistant element of one cable is joined to the end of the tensile resistant element of the other cable by a tubular clamp which is surrounded by a plastic layer having through-cavities in which the optical fibers are received and joined. If the optical fibers are in fluid filled tubes, the tubes are connected by further fluid-filled tubes surrounding the optical fiber connections. The plastic layer may be surrounded by a further plastic layer, and the cable metal sheaths are interconnected by a metal tube in watertight relation to the sheaths. The metal tube is surrounded by a plastic sheath and if desired, other layers, other than an armor which, by itself, can sustain the water pressure, may surround the plastic sheath.

10 Claims, 4 Drawing Figures

JOINT FOR OPTICAL FIBER SUBMARINE CABLES'

The present invention relates to joints for submarine, optical fiber, telecommunication cables, and more particularly, to joints for those submarine, optical fiber, telecommunication cables, where the only mechanically resistant armouring provided occupies the radially innermost zone of the cables themselves. See, for example, the cables described in U.S. applications Ser. Nos. 723,265 and 723,039, both filed Apr. 15, 1985 and assigned to the assignee of the present application.

Whenever submarine cables are of very long lengths, they are formed by joining several cable lengths end-to-end. In submarine, optical fiber, telecommunication cable installations, such joints prove to be rather delicate points since their realization involves the simultaneous solving of several problems as follows:

a. Firstly, to ensure that, in the joint, the connection between optical fibers is safe and reliable;

b. To prevent the optical fibers in the joint from undergoing mechanical stresses, since such stresses can cause ruptures in the fibers or an attenuation of the signals transmitted. This problem is particularly important for submarine cable joints, especially if they are intended to be layed at great depths, for example, on sea floors at depths of over 1000 meters, because of the high compression stresses in the radial direction of the joint due to the effects of hydrostatic pressure;

c. A continuity has to be created between the armorings of the cable lengths which are connected one to the other by the joint, and at the same time, the flexibility of the joint should differ from that of the cables by the least possible amount;

d. The watertightness of the joints has to be guaranteed, so as to prevent any damage to the internal parts of the cable; and e. Finally, a reliable electrical continuity must be obtained in the joints for the electrical conductors incorporated in the cables through which the optoelectronic repeaters, for the signals transmitted by the optical fibers, are fed. Moreover, all of the above-listed problems must be solved by reducing to the minimum the overall dimensions of these joints, in order to facilitate the cable laying operations of the cables that incorporate such joints.

One object of the present invention is to provide a joint, for submarine, optical fiber, telecommunication cables, which may be formed rapidly and simply and which solves all the above-mentioned problems in an optimum manner and in such a way that the overall dimensions of the joint itself are substantially equal to the dimensions of the cables which it interconnects.

The principal object of the present invention is to provide a joint for submarine, optical fiber, telecommunication cables of the type in which the armoring occupies the radially innermost zone of the cables, said armoring being circumscribed by a plastic core in which there are present through-cavities, filled with an incompressible fluid and where optical fibers are loosely lodged. The cables include a watertight, metallic sheath, covered externally with a plastic layer, which adheres to said core. Said joint is characterized by comprising:

(1) a mechanical connection which butt joins the armorings of the cables end-to-end;

(2) at least one tubular plastic layer which fills up all spaces between the mechanical connection and the cable cores, said tubular plastic layer being provided with through cavities, filled with a practically incompressible fluid, extending in the longitudinal direction of the joint in which the optical fibers of the two cables and their connections are disposed;

(3) a metallic tubular length, constituting the watertight sheath of the joint, secured, in a sealed manner, to the ends of the metallic watertight sheaths of the cables; and (4) the joint is without any mechanically resistant armoring placed externally and circumscribing the zone in which the optical fibers are disposed.

In the text, by the term: "incompressible fluid", liquid substances, and preferably viscous substances with a high viscosity, are intended. Gases are excluded by this term.

Other objects and advantages of the present invention will be apparent from the following detailed description of the presently preferred embodiments thereof, which description should be considered in conjunction with the accompanying drawings in which.

In general, a joint according to the invention is adapted to be applied to submarine, optical fiber, telecommunication cables of the type wherein the armoring occupies the radially innermost zone of the cables with said armoring being circumscribed by a plastic core wherein there are present through-cavities, filled with an incompressible fluid, which loosely receive at least one optical fiber, and wherein a watertight metallic sheath, covered externally by a plastic layer, adheres to said core.

Figure 1:
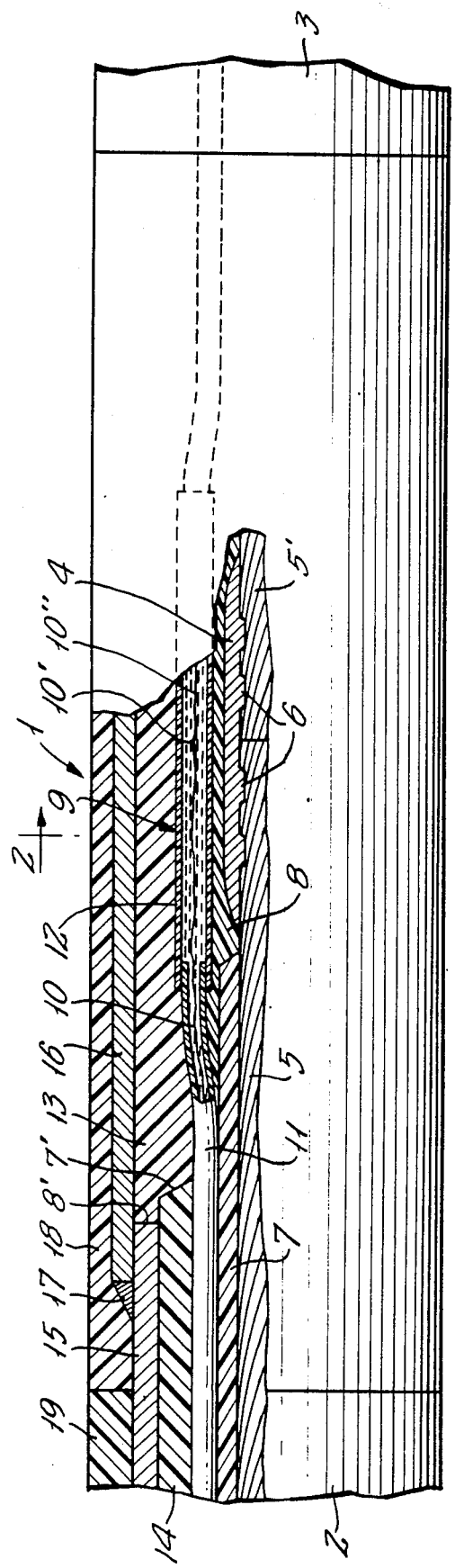
FIG. 1 is a partial longitudinal section view of one embodiment of the joint of the invention.
Figure 2:
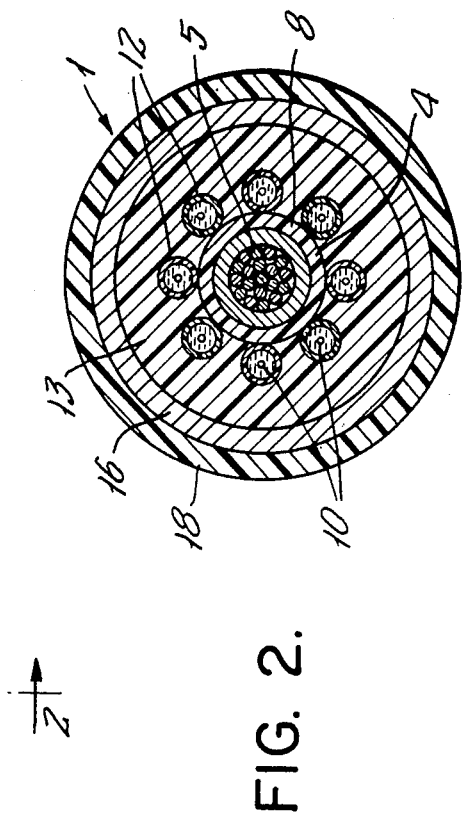
FIG. 2 is a transverse cross-section of the joint, taken along the line 2—2, in FIG. 1.

In FIGS. 1 and 2, there is shown a joint 1, according to the invention, which connects two cable lengths 2 and 3 which are of the previously mentioned type of cables (for example, the cables according to U.S. application Ser. No. 723,265) at whose facing ends the components have been stripped in a staggered way.

As can be seen in FIGS. 1 and 2, the joint 1 comprises, from the inside toward the outside, a mechanical connection, for example, a metallic clamp 4 or, as an alternative, a hardened welding or such like, between the bared ends of the cable armorings 5 and 5' which are aligned end-to-end. The metallic clamp 4 is clamped on the extremities of the armorings 5 and 5' (of the cable lengths 2 and 3), which are constituted by antitorsional, compact wire ropes, the interspaces between the wires being filled with an incompressible fluid.

In particular, the clamp 4 has substantially the form of a pipe length which, after being clamped over the armoring, has protuberances 6, extending from the inner surface of the clamp 4.

Each space, between the inner surface of the clamp 4 and the cable armorings 5 and 5', is filled by the same, practically incompressible fluid, that fills up the spaces between the wires of the ropes constituting the said armorings 5 and 5' of the cables. The practically incompressible fluid is, for example, a petroleum jelly, a silicone grease, and such like.

Moreover, the metallic clamp 4 is structured and hence, dimensioned in such a way as to totally resist andy tensile stresses exercised on the joint during the cable laying, or the cable picking up operations. Also, the clamp 4 has the function of carrying out the electrical connection between the armorings (of the cable lengths), the conductivity of which may be improved, for example, by the presence of a highly conductive metallic element, such as a copper wire.

Over the metallic clamp 4 and over the bared tracts in the first layer 7 of the cables' core, there is present a covering layer 8 which is obtained, for example, through extrusion means, or by wrapping with tapes of plastic material, for example, tapes of polypropylene, of polyvinyl chloride, of nylon, and the like. Both extremities of the layer 8 are tapered, in such a way as to give to them a spindle form.

Upon the layer 8, there rest the connections 9 of the optical fibers 10 and the terminal portions of the small tubes 11 of the cables which are filled with an incompresible fluid and in which the optical fibers are loosely received.

In the particular embodiment, shown in FIG. 1, a connection 9 has the following described structure. Each optical fiber 10, of the cable 2, is butt-welded at 10', to an optical fiber 10" of the cable 3. Said optical fibers have an undulatory configuration in the tube in which they are interconnected.

Over the welding zone 10', of each pair of optical fibers, there if present a plastic or metallic sleeve 12, which is filled with a practically incompressible fluid, such as, for example, a petroleum jelly, a silicone grease, and such like. The ends of the small tubes 11, of the two cables, penetrate into the extremities of the sleeves 12.

Should the sleeves 12 be made out of plastic material, this could be, to advantage, of the type which shrinks under the effects of heat, so as to clamp onto the extremities of the small tubes 11 inserted into it.

The wall-thickness of each sleeve 12 and of the small tubes 11, depends upon the entity of the spaces left free by the practically incompressible fluid requires that the sleeve 12, itself, have a mechanical resistance to radial compression which must compensate for any loss of support at its inner wall by the practically incompressible fluid.

A tubular layer 13 is superimposed over the covering layer 8 of the clamp 4, and it encompasses, within the radially innermost surface, the small tubes 11 and the sleeves 12 filled with incompressible fluid, thus creating through-cavitities inside said tubular layer 13.

The layer 13 contacts and becomes fixed by the surfaces 7' and 8' respectively, of the plastic layer 14 of the core of the cables 2 and 3 and of their metallic sheath 15. Moreover, the diameter of the outer surface of the tubular layer 13 is substantially equal to the diameter of the outer surface of the metallic sheaths 15 of the cables.

Over the tubular layer 13, in direct contact with its outer surface, there is a metallic tube length 16. for example, of aluminum, which constitutes the joint's sheath, the extemities of which are fixed, in a sealed manner, by means of welding 17, to the cables' metallic sheath 15. The tubular length 16, in giving continuity to the metallic sheaths of the cables, not only provides a watertight sealing but also provides electrical continutity when said sheaths constitute one of the electrical conductors for feeding the optoelectronic repeaters for the signals transmitted by the optical fibers.

In general, the wall thickness of the tubular length 16, has the minimum value required by the mechanical needs, for example, some tens of millimeters, and thickness remains substantially constant no matter what the depth may be at which the cables, incorporating the joints according to the invention, are layed.

The tubular length 16 is next covered externally with a plastic layer 18 which is secured to the plastic layers 19 of the cables' sheaths. In particular, the diameter of the outer surface of the layer 18 is, preferably, equal to the diameter of the outer surface of the plastic layers 19 of the cables.

Around the layer 18 there can be present other coverings such as, for example, anti-shipworn protections of the already known type, should be cables, connected by joints, require them.

In the embodiment just described with reference to FIGS. 1 and 2, the layer 8 can be omitted. In this case, the sleeves 12 bear directly against the clamp 4, and the tubular layer 13 surrounds the sleeves 12 and the small tubes 11 and adheres directly to the clamp 4, filling all spaces between the clamp 4 and the layers 7 and 14 of the cores of cables 2 and 3.

Figure 3:
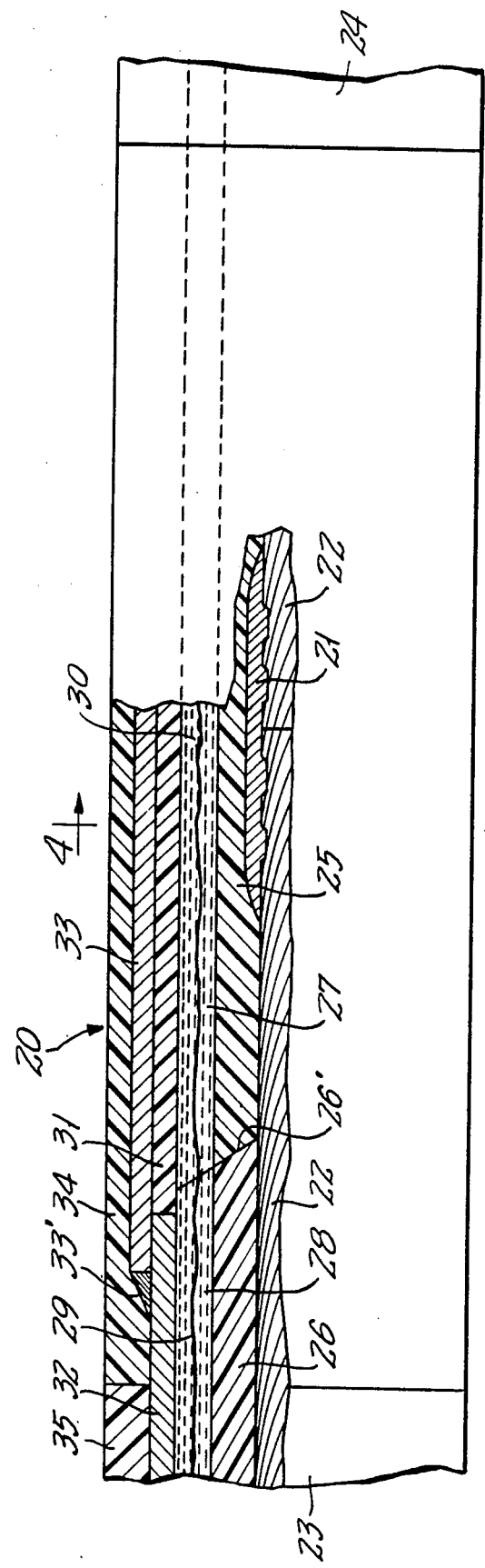
FIG. 3 is a partial longitudinal section view of an alternative embodiment of the joint of the invention.
Figure 4:
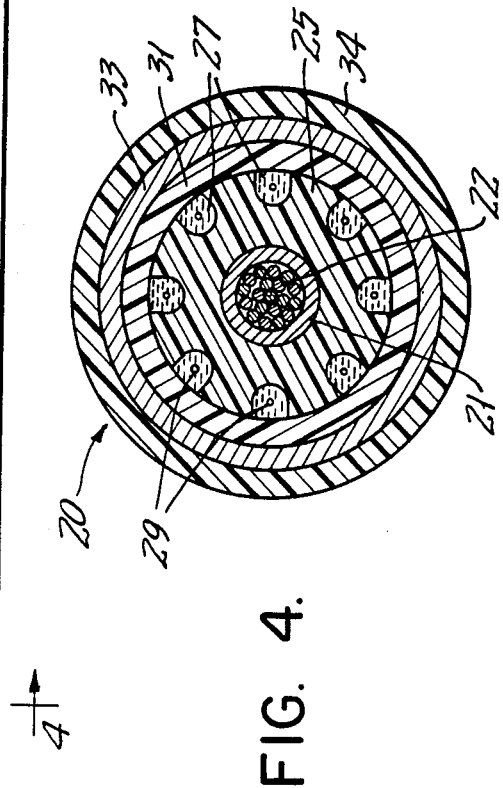
FIG. 4 is a transverse cross-section, taken along the line 4—4 in FIG. 3 of the joint shown in FIG. 3.

In FIGS. 3 and 4, there is illustrated an alternative embodiment of the joint according to the invention which is particularly appropriate, but not necessarily restricted (as will be explained further on), for connecting, one to the other, two cable lengths described in the U.S. Patent application Ser. No. 723,039.

In the following description of the alternative embodiment of the joint of the invention, the most important components of the above-mentioned cables, will be mentioned.

As can be seen in FIGS. 3 and 4, a joint 20 according to the invention, has a mechanical which is preferably constituted by a metallic clamp 21 or, as an alternative, by a hardened welding and such like, clamped on the stripped extremities, disposed end-to-end, of the armorings 22 of the cable tracts 23 and 24. Said armorings are constituted by compact, anti-torsional wire ropes, and the spaces, between the wires, are filled with an incompressible fluid. Clamp 21 is identical to clamp 4 (of FIG. 1) and, as in the case of this latter, all spaces between the clamp 21 and the armoring 22, are filled with an incompressible fluid.

Around clamp 21, there is a tubular plastic layer 25 which adheres to the clamp 21 and which is linked to the surfaces 26' of the plastic cores 26 of the cables' tracts 23 and 24.

On the outer surface of the tubular layer 25, which, in this particular case, is aligned with the inner surface of the cables' metallic sheath 32, through cavities are present, constituted by grooves 27 which are filled with an incompressible fluid. Said grooves 27 are connected to the pairs of grooves 28 present in the cores of the cables 23 and 24, and said grooves 28 are filled with an incompressible fluid with the optical fibers 29 loosely received therein.

The extremities of the optical fibers 29 of the two cable tracts 23 and 24, which extend from the grooves 28 (for a length, that is, for example, greater than that needed for connecting them), are placed in the grooves 27 of the layer 25 and are buttwelded (at point 30) so as to provide a connection.

Around the outer surface of the tubular layer 25, there is present a covering 31, constituted by a plastic layer which provides a wall for closing the grooves 27 of the layer 25. The covering 31 can be obtained, for example, by a winding of plastic tapes, or by extrusion.

The radially outermost surface of the covering 31 preferably has a diameter which is equal to the outer diameter of the metallic sheaths 32 of the cables 23 and 24. A length of metal tubing 33, constituing the watertight sheath of the joint 20, contacts with its inner surface, the covering 31, and its extremities are fixed in a sealed manner, through the means of welding 33', to the metallic sheaths 32.

Moreover, the metallic tube length 33 is covered by a layer of plastic 34 fixed to the plastic sheath 35 of the cables.

According to an alternative embodiment of the joint shown in FIGS. 3 and 4, the covering 31 can be omitted. In this case, the tubular layer 25 has its radially outermost surface in direct contact with the metallic tube length 33 constituting the sheath of said joint.

According to a further embodiment of the joint shown in FIGS. 3 and 4, instead of bare optical fibers 29 loosely received in the grooves 28 of the cables, the fibers 29 may be protected by being inside small tubes which are filled with an incompressible fluid. In this case, the terminal portions of the small tubes, are placed inside the grooves 27 of the tubular layer 25 and are connected to one another by a sleeve, which is identical to the one indicated with the reference numeral 12 in FIG. 1, and which is filled with an incompressible fluid which circumscribes the zone in which the optical fibers are butt-welded together and which constitutes a component of the connection.

In this latter case, and when the covering 31 is obtained through extrusion, the plastic material of the covering 31 can be made to penetrate into the grooves 27 of the tubular layer 25, thereby providing ribs. Said ribs can also occupy the entire space left free in grooves by the small tubes and by the sleeves that rest at the base of said grooves and hence, the ribs have a surface which is complementary in form to that of the tubes-sleeves assembly.

In the latter case, it results that, in the joint of FIGS. 3 and 4, when the optical fibers are loosely received in small tubes which are connected to one another by sleeves, the radially innermost surface of the covering 31, has a configuration which is more or less of the same type as that of the tubular layer 13 in the joint according to the embodiment shown in FIGS. 1 and 2. In fact, in both these cases, the plastic material of one plastic layer of the joint, wraps itself around the surfaces of the small tubes and of the sleeves. This means that the joint shown in FIGS. 3 and 4, can also be utilized for connecting together the cables 2 and 3, of FIG. 1.

Moreover, it is also possible to utilize the joint of FIGS. 1 and 2 for connecting together the cables 23 and 24 (illustrated in FIG. 3). In this case, the terminal portions of the bare optical fibers 29 which extend from the grooves of the cables, are inserted into small tubes connected together by sleeves which rest upon the outer surface of the covering layer of the clamp, over which there is disposed the tubular layer provided, at its radially innermost surface, with through-cavities wherein the tubes and the sleeves are surrounded.

From the foregoing description of the embodiments of the joints, and from the considerations which follow, it can be understood that the objects of the present invention are achieved.

First and foremost, the joints for submarine cables, according to the invention, may be rapidly and simply achieved because no mechanical armoring has to be formed, either around the joint, or around that zone of the joint where optical fibers are present, for the purpose of protecting them from stresses in the radial direction which result from the action of the hydrostatic pressure. Notwithstanding this, the joints according to the invention still prove to have an optimum resistance to hydrostatic pressure.

In fact, a joint according to the present invention, is substantially devoid of spaces without any material, for which reason it cannot collapse, and hence, its structure remains intact, under the action of compression in the radial direction which is due to the effects of hydrostatic pressure.

Moreover, the joints according to the present invention have a minimum overall dimension possible because the diameter of their outer surface is substantially equal to the outer diameter of the cables which they interconnect.

Even the weight of the joint according to the present invention, is reduced to the minimum because the mechanical connection, between the armorings of the cables, is realized by simply having a clamp clamped on the extremities of said armorings, or by a hardened welding. Protecting armorings are absent around the joint and, in particular, around the zone of the joint wherein the optical fibers are positioned.

The reduction to the minimum, of the overall dimensions and of the weight of the joints according to the present invention, provides fewer difficulties during the laying operation of cables which incorporate these joints.

Finally, a joint according to the invention, allows for providing electrical continuity to the cables' conductors, which are constituted by the armoring and by the metallic sheath, for feeding the optoelectronic repeaters of the signals transmitted by the optical fibers. Said continuity, on the part of the joint, is obtained with the mechanical connection which connects the armorings of the cables and by the metallic sheath of the joint which connects together the metallic sheath of the cables.

In this situation, the electric field in the joint is confined between the mechanical connection and the watertight metallic sheath, and hence, there are no electrical stresses arising in the plastic material which covers the metallic sheath. Therefore, even though the plastic covering of the metallic sheath of the joint is in contact with the sea water, the absence of any electrical stresses in it prevents electrochemcial phenomena from taking place which could give rise to the formation of the so-called "treeing" phenomena and to the possibility of corrosion of the metallic sheath of the joint.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A joint for submarine, optical fiber, telecommunication cables, of the type in which the armoring is at the radially innermost zone of the cables, said armoring being a plurality of side-by-side wires and being circumscribed by a plastic core in which there are present axially extending through-cavities which are filled with an incompressible fluid, and which loosely receive optical fibers, and in which a watertight metallic sheath, covered externally with a plastic layer, contacts said core, said joint comprising:

means mechanically interconnecting the armorings of the cables in end-to-end abutting relation;

a substantially incompressible fluid filling any otherwise empty spaces within said means including any such spaces between said wires of said armorings;

at least one tubular plastic layer filling all spaces between the said means and the cable cores, said tubular plastic layer being provided with through-cavities, filled with a substantially incompressible fluid and extending in the axial direction of the joint from each through-cavity of one said cable core respectively to a through-cavity of the other said cable core, the last-mentioned said through-cavities being disposed radially outwardly of said means and the interconnected end of the armorings and extending substantially parallel to each other, and the optical fibers being received and interconnected in the last-mentioned said through-cavities;

a watertight metal tube around said plastic tubular layer and secured in a watertight manner to the ends of the metallic watertight sheaths of the cables, said watertight metal tube by itself having a resistance to compression which is insufficient to withstand the compression forces to which the joint is subjected during use thereof; and said joint being without armor externally of said plastic tubular layer which, by itself, can withstand the mechanical stresses to which the joint is subjected in use whereby the necessary resistance to the hydrostatic pressure encountered when the joint is submerged in water is obtained without any armor external to said plastic tubular layer.

2. A joint as set forth in claim 1 wherein said means mechanically interconnecting the armorings of the cables is a metallic clamp.

3. A joint as set forth in claim 1 wherein the ends of the optical fibers of one cable are interconnected with the ends of the optical fibers of the other cable within the joint and wherein the interconnections are each surrounded by a sleeve filled with a substantially incompressible fluid.

4. A joint as set forth in claim 3 wherein the through-cavities in said tubular plastic layer are at the latter's radially innermost surface, wherein said optical fibers are received in tubes filled with a substantially incompressible fluid and wherein said tubular plastic layer adheres to said tubes and said sleeve and is in contact with said metal tube.

5. A joint as set forth in claim 4 wherein said tubular plastic layer also adheres to said means.

6. A joint as set forth in claim 4 further comprising a further layer of plastic intermediate said tubular plastic layer and said means.

7. A joint as set forth in claim 1 wherein said through-cavities of said tubular plastic layer are grooves in the outermost surface of said tubular plastic layer and said optical fibers and their interconnections are loosely received in said grooves, said tubular plastic layer being adhered to said means.

8. A joint as set forth in claim 7 wherein there is a further layer of plastic material intermediate said tubular plastic layer and said metal tube which closes said grooves.

9. A joint for submarine, optical fiber, telecommunication cables, of the type in which the armoring is at the radially innermost zone of the cables, said armoring being circumscribed by a plastic core in which there are present through-cavities which are filled with an incompressible fluid, and which loosely receive optical fibers, and in which a watertight metallic sheath, covered externally with a plastic layer, contacts said core, said joint comprising:

means mechanically interconnecting the armorings of the cables in end-to-end abutting relation;

at least one tubular plastic layer filling all spaces between the said means and the cable cores and adhering to said means, said tubular plastic layer being provided with through-cavities in the form of grooves in the outermost surface thereof, filled with a substantially incompressible fluid and extending in the longitudinal direction of the joint, the optical fibers being loosely received and interconnected in said through-cavities;

a metal tube around said plastic tubular layer and secured in a watertight manner to the ends of the metallic watertight sheaths of the cables;

a further layer of plastic material intermediate said tubular plastic layer and said metal tube, said further layer of plastic material having portions extending into said grooves; and said joint being without armor externally of said plastic tubular layer which, by itself, can withstand the mechanical stresses to which the joint is subjected in use.

10. A joint as set forth in claim 9 wherein said optical fibers are loosely received in tubes filled with a substantially incompressible fluid and said tubes are interconnected by further tubes filled with a substantially incompressible fluid, said optical fibers and their interconnections being within said further tubes and said further layer of plastic material fills all portions of said grooves not occupied by said tubes.

* * * * *

UNITED STATES PATENT AND TRADEMARK OFFICE
CERTIFICATE OF CORRECTION

PATENT NO. : 4,699,459

DATED : October 13, 1987

INVENTOR(S) : Priaroggia

It is certified that error appears in the above-identified patent and that said Letters Patent is hereby corrected as shown below:

```
Col. 3, line 5, "andy" should read --any--
        line 23, "presible" should read --pressible--;
        line 33, "if" should read --is--;
        line 44, after "fluid" insert --which, for any
reason, could be present in them.  In fact, an incomplete
filling of the sleeve 12 by the incompressible fluid--;
        line 63, "extemities" should read --extremities--;
Col. 4, line 37, after "mechanical" insert --connection--.
```

Signed and Sealed this

Fifth Day of April, 1988

Attest:

Attesting Officer

DONALD J. QUIGG

Commissioner of Patents and Trademarks